YOSHIAKI TOMOZAWA
INVENTOR.

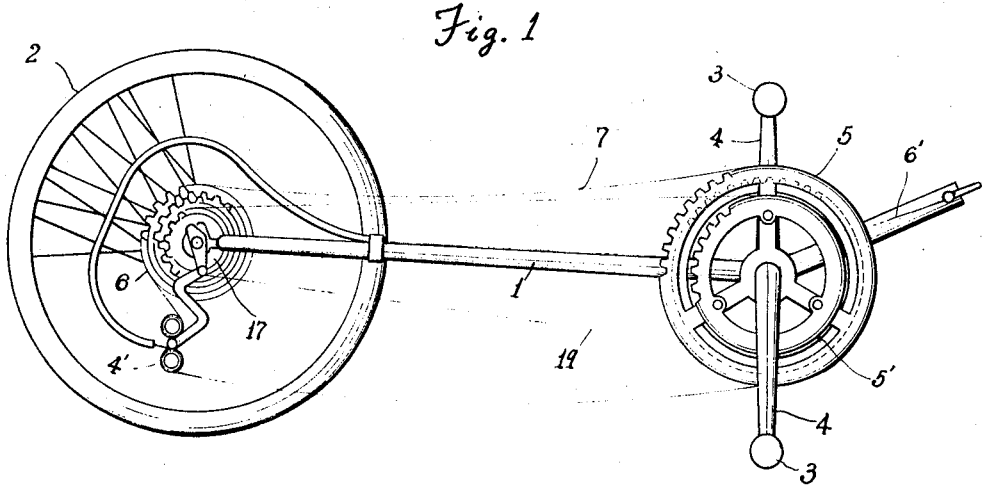
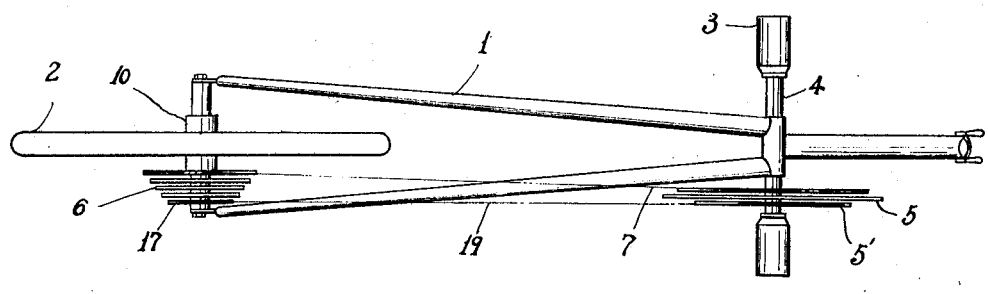

United States Patent Office 3,506,100
Patented Apr. 14, 1970

3,506,100
EXPOSED SPEED CHANGE MECHANISM FOR A
BICYCLE EQUIPPED WITH COASTER BRAKE
Yoshiaki Tomozawa, Osaka, Japan, assignor to Nankai
Tekko Co., Ltd., Osaka, Japan
Filed June 4, 1968, Ser. No. 734,424
Claims priority, application Japan, June 20, 1967,
42/39,498
Int. Cl. F16d 41/30, 67/02, 41/28
U.S. Cl. 192—6                                    1 Claim

ABSTRACT OF THE DISCLOSURE

This invention relates to an exposed speed change mechanism for a bicycle equipped with a coaster brake, comprising a multi-stage sprocket wheel assembly consisting of a plurality of sprocket wheels of different diameter, said multi-stage sprocket wheel assembly being mounted on a driving drum rotatably mounted on the rear axle for controlling the coaster brake, which is actuated by back pedalling the crank having a special front sprocket wheel provided in addition to usual front sprocket wheel, in which the brake can be applied by transmission of power from said additional front sprocket wheel through a separate chain and a sprocket wheel rotatably mounted on the rear axle provided solely for braking purpose.

---

Heretofore it has been considered practically impossible to provide a coaster brake in the so-called exposed speed change mechanism comprising multi-stage sprocket or chain wheel assembly. This is substantially due to the following circumstance: said exposed speed change mechanism comprises a multi-stage sprocket wheel assembly consisting of a plurality of sprocket wheels of different diameter and loosely mounted on the rear dead axle, and so arranged that the driving chain running around one of the sprocket wheels is changed-over to be engaged with another sprocket wheel of different size to obtain a desired speed ratio driving.

At the time of change-over of the driving chain from one to the other of the sprocket wheels, the chain should be disengaged from one of the sprocket wheels before it is brought into engagement with the other sprocket wheel. For the purpose, the chain must be considerably slackened. The greater the degree of slackening, the more chance of causing derailment of the driving chain. Assuming that a coaster brake is provided in usual manner associated with the conventional exposed speed change mechanism referring to FIG. 5, employing one driving chain *a*, when the driving chain *a* is moved in the direction of arrow E the forward drive is attained and, on the other hand, when the driving chain *a* is moved in the direction of arrow E' the coaster brake will be applied, thereby stopping the bicycle. Thus it will be seen that one driving chain *a* serves for dual purpose of driving and braking, so that any derailment of the chain will result in losing the brake effect. From the foregoing, it would be recognized that the provision of usual coaster brake associated the exposed speed change mechanism comprising multi-stage sprocket wheel assembly, in which the driving chain is liable to be derailed, will cause an extremely dangerous result in driving bicycle. Furthermore, when the driving chain is slackened, this amount of slack (lower run of the driving chain in FIG. 1) must be absorbed before producing effective brake action by effecting excessively earlier back pedalling. This would result in too late braking action for any emergency purpose. At the initial point of back pedalling, there is unavoidably a considerable amount of play of movement till effective braking action is obtained. At the time of change-over of speed ratio, the driving chain is once disengaged from the sprocket wheel, so that the coaster brake cannot be applied during the period of making change-over of driving speed ratio.

The principal object of the present invention is to provide an exposed multi-stage speed change mechanism comprising a plurality of sprocket wheels of different diameter mounted on the rear wheel axle hub, and equipped with an improved coaster brake which can be readily assembled and is reliable and safe in operation.

Other objects will become apparent from the following description of an embodiment of this invention taken in connection with the accompanying drawings, wherein:

FIGURE 1 is a righthand side view of a part of a bicycle according to the present invention, non-related parts being omitted;

FIGURE 2 is a plan view thereof;

Figure 3:
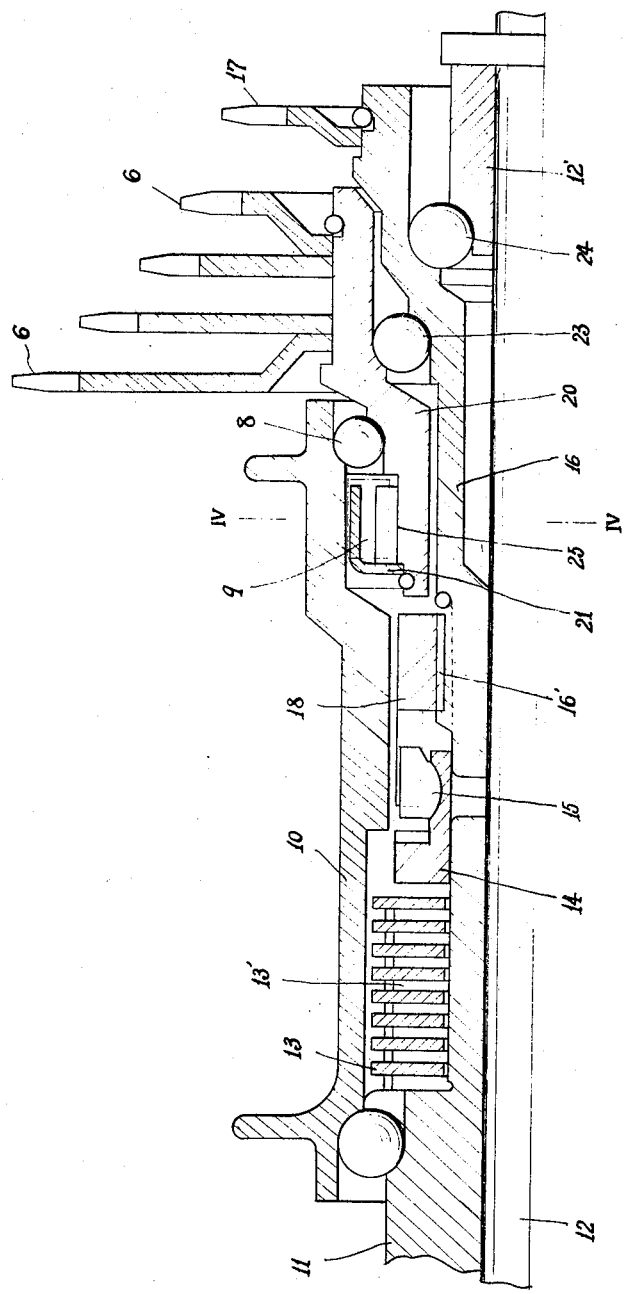
FIGURE 3 is a longitudinal sectional view of the coaster brake parts.

Referring to the drawing, the reference numeral 1 designates a chain stay bridge of a bicycle, and 2 a rear wheel. Pedals 3 are carried by pedal cranks 4. 4' is a chain derailer of conventional type. 5 is a usual front chain sprocket, and 5' is a special front chain sprocket employed in this invention, which will be described in detail hereinafter. A multi-stage chain sprocket assembly 6 is mounted on the rear dead axle of the bicycle, with which a driving chain 7 is engaged as shown. The driving chain 7 is changed over from one sprocket wheel to another sprocket wheel as desired for speed change purpose by means of a change-over device (not shown) which is controlled by a Bowden wire 6'. The construction and operation of said chain derailer 4' and the sprocket change-over device are conventional and well-known in the art of exposed speed change mechanism for bicycle and form no part of the present invention, so that a detailed description of the equipment is not considered necessary.

Figure 4:
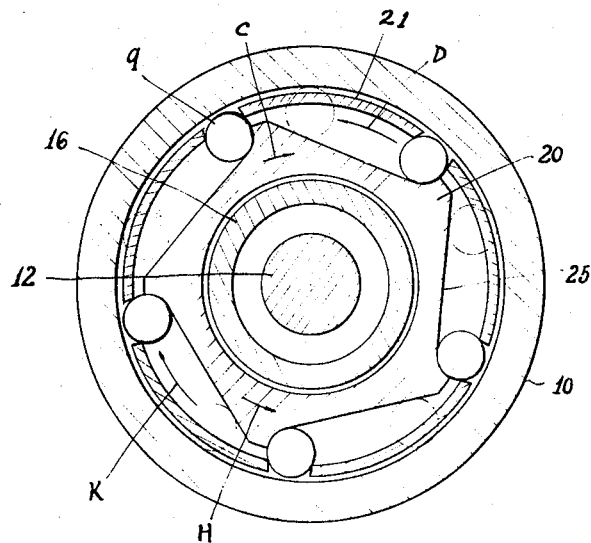
FIGURE 4 is a cross-sectional view taken along lines IV—IV of FIGURE 3.
Figure 5:
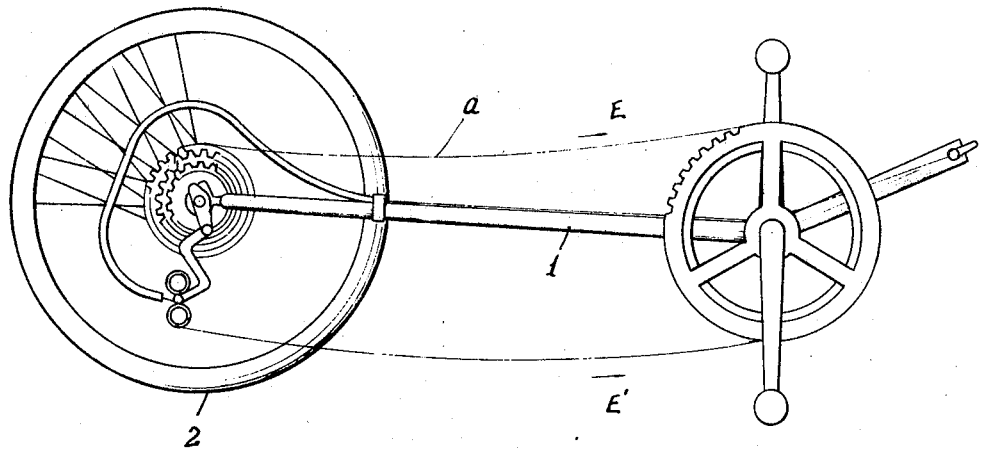
FIGURE 5 is a schematic view for the sake of explaining the operation of the driving chain serving associated with multi-stage driving sprocket wheels for speed change.
Figure 6:
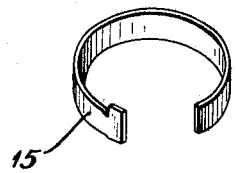
FIG. 6 is a perspective view of the return spring shown in FIG. 3.

10 is a hub shell, into which the inner extension of a driving drum 20 having said multi-stage sprocket wheel assembly 6 is inserted, and the hub shell 10 is supported on the driving drum 20 through bearing balls 8. Inserted into the driving drum 20, there is a cylinder 16 having its inner end 16' screw threaded, and bearing balls 23 are inserted therebetween. The cylinder 16 in turn is supported by conventional bearing race cone 12' through bearing balls 24. The driving drum 20 has an inner extension, of which periphery is provided with a plurality of cam faces 25 (FIG. 4). Between said cam faces 25 and the hub shell 10, there is inserted a cage 21 retaining rollers 9.

When the sprocket wheel assembly 6 is rotated in the forward drive direction, the driving drum 20 is rotated in the direction of arrow C, whereby each roller 9 is moved along the cam face 25 in the direction of arrow D to the position shown in chain line in FIG. 4 so that each roller 9 is brought into strong contact with the higher point of the cam face and the inner wall of the hub shell 10, thereby driving the bicycle forwardly.

During the forward drive of the bicycle, when the rotating sprocket wheel assembly is stopped, each roller 9 will move in the direction of arrow K due to friction with the inner wall of the hub shell 10. In other words, each roller 9 returns toward its initial position shown in solid line (FIG. 4), i.e. the lower position of the cam face 25, whereby releasing the engagement with the hub shell 10, so that the bicycle continues its free wheeling. Upon back pedalling, the cranks 4 rotate in the reverse direction (direction for applying coaster brake), and the driving drum 20 will be rotated in the direction of arrow H, and the rollers 9 maintaining the position shown in solid line will be the highest position of the cam faces 25, the rollers 9 freely moving along the inner wall of the hub shell 10. Said cam faces of the driving drum 20 and the rollers 9 are forming a so-called one-way roller clutch.

11 is a brake holder securely mounted on the axle 12, and 13 are brake discs on said holder. 14 is a brake disc presser provided with a return spring 15. 16' is a male screw thread on the inner extension of the cylinder 16 and is engaging with a female screw 18. 17 is a brake sprocket wheel mounted on the outer end of the cylinder 16, and this serves for braking. It will be seen that the above-mentioned coaster brake is applied by rotation of said brake sprocket 17 in the reverse direction. By reverse rotation of said sprocket wheel 17, the female screw 18 will be axially moved leftwardly, pushing the presser 14, whereby the brake discs 13 are pressed, so that brake is applied on the hub shell 10. The female screw 18 is not directly associated with hub shell 10, but it is adapted to rotate relative to the hub shell even during the forward driving of the bicycle. Thus, the sprocket wheel 17 is used solely for the purpose of braking, whereas the multistage sprocket wheel assembly 6 serves solely for forward driving.

Beside the above-mentioned front sprocket wheel 5, there is integrally mounted another front sprocket wheel 5' (FIG. 1) which is connected with said brake sprocket 17 by means of a second chain 19 adapted solely for braking purpose.

The operation of this invention is as follows: According to this invention, for driving the bicycle the front sprocket wheel 5 and the second front sprocket wheel 5' are rotated by usual pedalling, thereby transmitting the rotation to the hub shell 10 for forward drive. In this case, the male screw 18, the female screw 16' and the return spring 15 are held independent from the hub shell 10, and will be rotated freely by transmission of power from the second front sprocket wheel 5' to the brake sprocket 17. When it is desired to apply brake, the driver should effect back pedalling as usual, thereby through the second front sprocket 5', the chain 19, the brake sprocket wheel 17 and the male screw 16', and the female screw 18 which moves leftwardly, the brake discs 13 will be pressed, so that the brake will be applied as described above.

From the foregoing it will be seen, according to this invention, that the chain 19 for braking is independent in operation from the speed change sprocket wheel assembly 6 and, therefore, the chain 19 which requires no changeover of engagement is always maintained under tension and is not liable to be disengaged from the sprocket wheels 5' and 17, so that any dangerous result may be avoided.

What I claim is:

1. An exposed speed change mechanism equipped with a coaster brake, comprising a hub shell, a driving drum having multistage sprocket wheel assembly consisting of a plurality of sprocket wheels of different diameter, a front sprocket wheel, a driving chain connecting said front sprocket wheel with one of said multi-stage sprocket wheels, a second front sprocket wheel secured to said first sprocket wheel, a cylinder having at its outer end a brake sprocket wheel and at its inner end a male screw, a brake chain connecting said second front sprocket wheel with said brake sprocket wheel, coaster brake discs, a female screw in engagement with said male screw and adapted to be axially moved by rotation of said brake sprocket wheel, said female screw and the hub shell being rotatable relative to each other, wherein the periphery of the driving drum in the hub shell is provided with a plurality of cam faces, and a plurality of rollers are inserted between the inner wall of the hub shell and said cam faces, each roller being disposed in contact with each cam face, thereby forming a one way roller clutch.

References Cited

UNITED STATES PATENTS

| 1,168,614 | 1/1916 | Ellett | 192—6 |
| 3,190,415 | 6/1965 | Schwerdhofer et al. | 192—6 |

FOREIGN PATENTS 853,828   12/1939   France.

MARK NEWMAN, Primary Examiner

U.S. Cl. X.R.

192—12, 19